Figure 4:
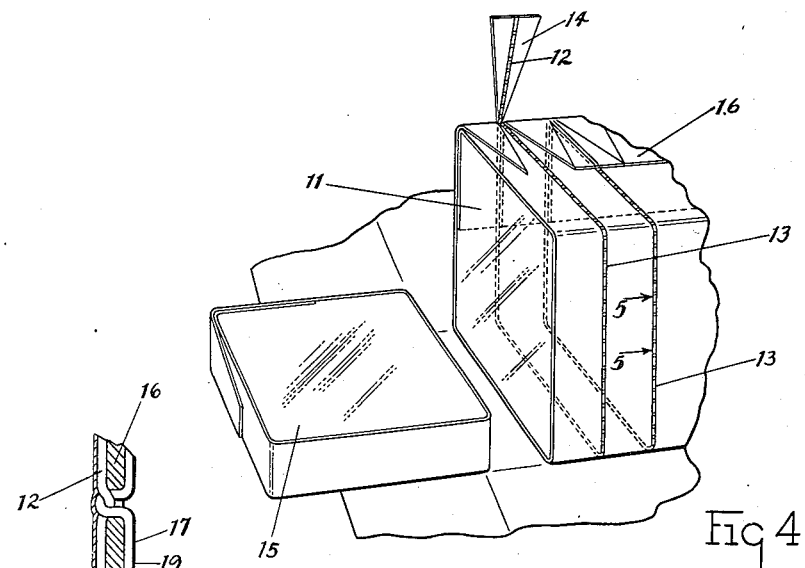

Aug. 17, 1948.　　　C. J. SCHNEIDER　　　2,447,096
PARTITIONING MEANS FOR PARTIBLE BODIES
Filed March 2, 1943　　　　　　　　　　2 Sheets-Sheet 1
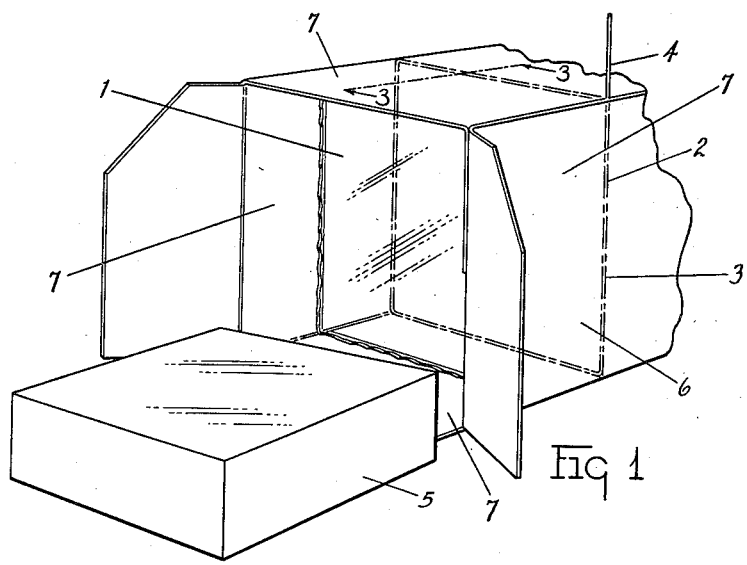
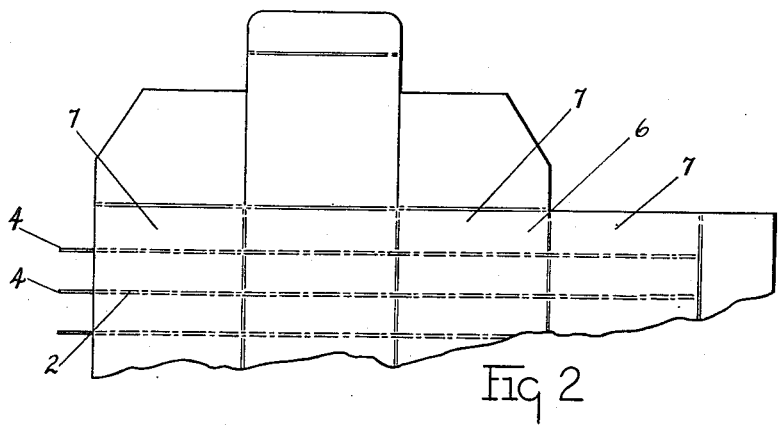
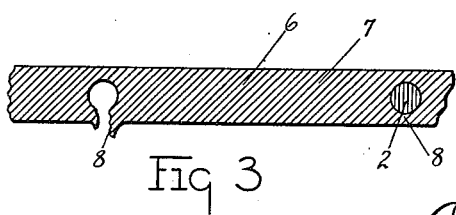
Inventor
Cale J. Schneider
Attorney Aug. 17, 1948.  C. J. SCHNEIDER  2,447,096
PARTITIONING MEANS FOR PARTIBLE BODIES
Filed March 2, 1943  2 Sheets-Sheet 2

Inventor
Cale J. Schneider
By
Attorney

Patented Aug. 17, 1948

2,447,096

UNITED STATES PATENT OFFICE 2,447,096

PARTITIONING MEANS FOR PARTIBLE BODIES

Cale J. Schneider, Toledo, Ohio

Application March 2, 1943, Serial No. 477,713

14 Claims. (Cl. 31—22)

My invention relates to the art of partitioning a body into portions of a desired size and shape. The invention particularly relates to a partitioning means which is readily adaptable for use in connection with plastic bodies such as butter, cheese, putty and grease and coherent bodies such as pressed comminuted meat, cake and frozen confection.

The invention has for one of its broader objects to provide an article of manufacture having a particle body and a partitioning means therefor and associated therewith in the assembly or packaging during the production or preparation processes of said body for delivery to the trade and in a position for immediate and ready utilization. Thus, the partitioning means of my invention is individual to each separate body and in keeping with such individual character it is of an insignificant cost and, after having served its function, may be easily discarded.

A still further object of the invention is to provide, together with a partible body, a partitioning strand means therefor and a foldable sheet means adapted for wrapping about the partible body for supporting the strand means so that the same extends linearly to coincide with a predetermined and desired plane of partition of said body. Further, my invention has for an object to provide a partitioning strand supporting means which predetermines the line from which the strand first moves and subsequently progresses in its lateral partitioning movement and operates to urge the strand to move in a path coinciding with the desired plane of partition, as distinct from haphazard movements, unrelated to the body and its purposes. By this provision and fulfillment of this object, measured and uniformly shaped portions of the body may be secured.

Said strand-supporting means may, in its various embodiments, extend over the surface of the body, be bendable or foldable to advantageously and substantially enclose, enwrap or encircle the body therewithin. Thus, in certain circumstances, the said strand-supporting means may be embodied in and utilized as a packaging element of said body. By thus combining the functions of packaging the body and supporting the partitioning strand in a single means, those skilled in the art will appreciate that a commercially feasible method of assembling the partitioning strand and the body through the use of simple assembling, folding or packaging machinery or relatively unskilled manual operators is made practicable.

Further, in connection with the last mentioned objects and advantages, my invention has for an object to provide means for detachably securing said partitioning strand to said supporting means. Such securing means may be homogeneous and integral with the supporting means or extraneous thereto and associated therewith.

It becomes apparent, in constructions where the strand supporting means has portions to enclose the body and assume a certain predetermined relation to the body enclosed thereby, that the strand of each of a group of successive combinations of body and strand supporting means will be disposed in the same predetermined relation with its associated body to partition the same measured amount of material from each body. Thus, as before stated, the ready assembly of said partitioning strand with the partible body may be assurably obtained with current commercial methods. Also, the strand partitioning means may be prepared in advance of their contemplated use, stored, and subsequently issued for use in production assembly with the partible body. In this and other ways my invention has material advantages over the prior art.

Arrangements also may be had, as is illustrated by embodiments of my invention described hereinafter, whereby upon the movement of the strand through the body to partition the same, the package enclosing said body will be advantageously partitioned along a line which substantially coincides with the plane of the partition of said body. Thus, the remainder of the package element and body remains intact to obtain the advantages that flow from the assembled relation of the remainder of the package element and the body confined therein.

The invention consists in other features and advantages which will appear from the following description and upon examination of the drawings. Structures containing the invention may partake of different forms and still embody the invention. To illustrate practical applications of the invention, I have selected a preferred form of a partitioning means for partible bodies and certain modified forms thereof, as examples of the various structures and details thereof that contain the invention. I shall describe the selected forms hereinafter, it being understood that variations may be made without departing from the spirit of the invention. The particular forms selected are shown in the accompanying drawings and described hereinafter.

Figure 5:
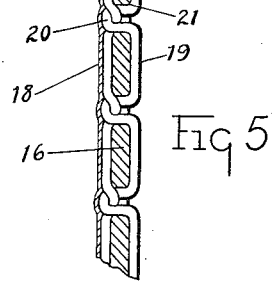
Figure 6:
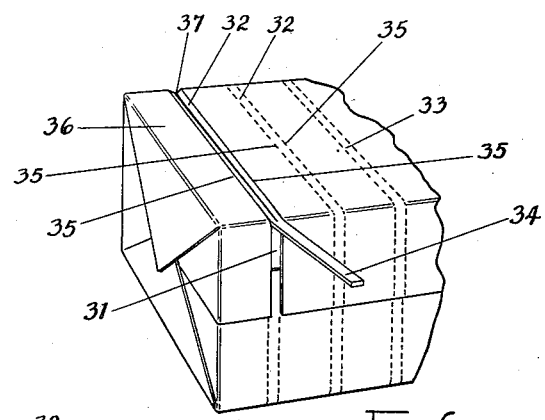
Figure 7:
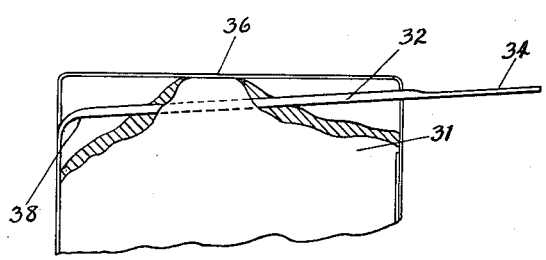

Fig. 1 of the accompanying drawings illustrates a perspective view of the preferred form of my invention showing a portion of the body partitioned therefrom by the partitioning means provided by my invention. Fig. 2 illustrates a partial plan view of the means for supporting the partitioning means and the partitioning means supported thereby. Fig. 3 illustrates a view of an enlarged section taken along the plane of the line 3—3 indicated in Fig. 1. Fig. 4 illustrates a perspective view of a modified form of my invention showing a portion of the body partitioned therefrom by the partitioning means provided by my invention. Fig. 5 illustrates a view of a greatly enlarged section taken along the plane of the line 5—5 indicated in Fig. 4. Fig. 6 illustrates a perspective view of another modification of my invention. Fig. 7 illustrates a view of a transverse section of the form shown in Fig. 6, showing, somewhat diagrammatically, the partitioning strand thereof in the course of partitioning the body of Fig. 6.

This application is a continuation in part of my copending application Ser. No. 258,501, filed February 25, 1939, for a Partitioning means for partible bodies, which has issued on June 1, 1943, as Letters Patent No. 2,320,386.

The invention is embodied in an article of manufacture having a partible body, such as that of the cheese bodies 1, 11 and 31 shown respectively in Figs. 1, 4, 6 and 7 of the accompanying drawings, and a partitioning means therefor. The partitioning means includes a strand which may be formed from any of a great number of inexpensive materials to render its provision a matter of small concern to the supplier and its disposal a matter of no concern for the user. Such materials as the cotton string 2 of Figs. 1 to 3, the thread 12 of Figs. 4 and 5, or the tape sheet material 32 of Figs. 6 and 7 and many others heretofore suggested may be used to good advantage.

Not only should the strand be formed of relatively cheap and easily disposed of material, but also should be formed from a material having sufficient tensile strength to perform the body partitioning function to which it is applied. The body partitioning function is best effected by first bringing the strand to a degree of tautness, to render the strand less laterally flaccid than normal, and then moving the strand, generally laterally in a plane through the body while substantially maintaining, more or less, the aforesaid degree of tautness. The strand must, therefore, have such strength as to withstand not only the necessary tautness to which it is preliminarily subjected, but also the increased tautness produced therein by the resistance of the body to the lateral movement of the strand through the body during partition. However, when a strand material of relatively low tensile strength is used, it may, by being shaped or formed to some cross-section or "streamline" having reduced friction with said body, perform equally as well as one of greater tensile strength but not so shaped. Such arrangement is illustrated by the construction shown in Figs. 6 and 7 of the accompanying drawing and described more particularly hereinafter.

When a partition means, as the strand 2 of the preferred arrangement shown in Fig. 1, is utilized, the strand is laid to form a bight 3 encircling the body 1. The strand is connected to a means for moving the same which in the construction shown in Fig. 1 is embodied in the integral extension 4 of one end of the strand 2. The other end of the strand is held against linear movement by any suitable means, such as the means for detachably securing the strand to its supporting means to be described hereinafter. Thus, the operator seizes the extension 4 and in drawing it away from the body, first, brings the strand 2 into a degree of tautness. Upon continued movement away from the body, the bight 3 is gradually constricted, the strand portions thereof moving generally laterally in a plane through and across the major axis of the body. When the bight 3 is completely constricted, a resultant partition of the body is effected to form a portion 5. The strand having served its function may then be discarded.

In order to provide for supporting the strand in a line of linear extension coinciding with a desired predetermined plane of proposed partition, my invention contemplates the provision of means for supporting the strand and having a relatively constant and predetermined relation with the body. My invention also contemplates the provision of means for detachably securing the strand to said supporting means along substantially the entire length of the strand in the sense that the strand is retained linearly against material deflection from its linear lay during the folding and bending of the supporting means about the partible body. The expression—the strand is detachably secured along its substantially entire length—is used hereinafter in the sense above outlined. The handling advantages flowing from such provisions have been generally referred to hereinbefore and will be appreciated by those skilled in art.

In the particular embodiment shown in Figs. 1 to 3 of the accompanying drawings, said supporting means includes a panel 7. The panel 7 extends over a surface of the body, and its perimeter substantially approximates the surface edges of the body. The assembly of the panel 7 with respect to the body 1 is relatively predetermined by the relative dimensions and shape of the panel and body 1. Thus, the strand supported by said panel will, through the predetermined relative disposition of the body and panel be likewise predeterminedly positioned relative to the body. The immediate and uniformly constant positioning of strand and body accomplished by the provision of said supporting means renders the use of my invention commercially feasible to current production processes, especially when utilized in conjunction with the provision of a means for detachably securing the strand to said supporting means along substantially the entire length of the strand. A plurality of adjoining panels 7 may be provided and hingedly connected together so that, when in assembled relation with the body, the panels substantially enclose and enwrap the body 1, encircling the major axis thereof. When thus assembled, the panels 7 form a suitable carton 6 for packaging the body.

Said means for detachably securing the strand to the supporting means may be embodied in any of a number of embodiments. The particular form shown in Figs. 1 to 3 of the accompanying drawings includes the provision of a strand supporting means having strand embedding or enclosing portions 8.

The strand enclosing portion 8 of the panel 7 operates, during the assembly of the panel with the body and the handling and manipulation incidental thereto, to hold the strand in its linear lay and in its relative position to the surface of the body 1 despite the flexing and bending of the panels 7 in forming the carton 6. The portion 8 also operates, in reaction to the operator's pull on the strand moving means 4, sufficiently to put and maintain the strand under the desired tautness preliminary to and during the lateral cutting movement of the strand. The portion 8, in reaction to the movement of the moving means 4, also operates to feed the bight forming portions of the strand to the body 1, progressively with the constriction of said bight, from a series of aligned and predetermined points along said supporting means. As the strand is drawn increasingly taut by the movement of the strand supporting means 4, the portions of the bight 3 more proximate to the means 4 overcome the resistance of the securing portions 8 of the panel 7. The said proximate portions of the bight 3 are thereupon released from securement to the panel supporting means and move generally laterally into the body 1. Upon continued movement of the means 4, the portions of the bight 3 progressively more remote from the means 4 overcome the resistance of the portions 8 and are released and move into the body. Thus, it will be apparent that the start and progress of the partitioning movement of the strand 2 is determined and controlled in accordance with the progressive release thereof by the portions of and their disposition over the panel 7 or corresponding panels adjoining thereto. Also, the partition of the body along a predetermined plane is assured.

As shown in the particular arrangement of Figs. 1 to 3 of the drawings, the strand 2 is embedded in the panel 7, the portions 8 completely enclosing the strand.

The element 6 and its panels may be impregnated with a water repellent. The panels 7 may be imprinted, on the exterior surface thereof, after the manner of commercial packages. When thus prepared, the assembly of the body 1, the partitioning strand or strands, and the enclosing element 6 and panels 7 may be effected expeditiously by automatic machinery or by unskilled hands with a repetitive constancy and commercial certainty.

When a partitioning means, such as the strand 12 of the arrangement shown in Figs. 4 and 5 of the accompanying drawings, is utilized, the strand is laid to form a bight 13. The strand is connected as by an extension thereof to a means, embodied in the tab 14, for moving the strand to close the bight and produce a portion 15. The strand is supported by a supporting means, which may be embodied in sheet wrapper element 16. The wrapper is adapted to be disposed in encircling relation to the body, as is illustrated in Fig. 4, and in so doing allocates the strand 12 to a desired position relative to the body.

In order to detachably secure the strand 12 to the supporting means wrapper 16, various means, such as a second strand 17, a membranous coating 18 and a combination of a second strand and a membranous coating may each be advantageously utilized. The strand 17 has spaced portions 19, which extend parallel to the strand 12 and portions 20, alternating with the portions 19, which extend angularly to said portions 19 and through openings 21 formed in the wrapper 16. The portions 20 are adapted to engage the strand 12 and, preferably, overlie and loop thereabout, as illustrated in Fig. 5 of the drawings, along substantially the entire length of the stand 12. The strand 17 and the partitioning strand 12 may be applied expeditiously to the wrapper 16 by a suitable stitching or other appropriate machine through which the wrapper 16 may be fed.

When the strand 17 is used as the partitioning strand supporting means, the tensile strain of partitioning is distributed between the two strands 12 and 17. In that sense both strands 12 and 17 cooperate and interchangeably function in the partitioning. Also, as the bight 13 is constricted, the portions 19 of the strand 17 are pulled through the wrapper 16, parting the wrapper along lines coinciding with the plane of body partition. This leaves the remainder of the body encased in the remaining wrapper and is advantageous to the dispenser of pieces in displaying the remaining body for sale to subsequent customers.

The loop portions 20 operate, as the tab 14 is moved to move the strand 12, to seize upon the strand and hold the same against linear movement. The resistance exerted in laterally moving the portions 19 of the strand 17 through the wrapper is sufficient in reaction to the movement of the tab 14 to put the strand 12 in the desired degree of tautness and to maintain the same during the partitioning. The same advantages of feeding the bight portions to the body and thereby guiding the strand in its partioning movements are obtained in the use of the wrapper 16 and strand 17 as was described with reference to the corresponding means illustrated in Figs. 1 to 3 of the drawings.

The membranous coating 18 is of skin like thickness and is applied over the strand 12 and over portions of the wrapper adjacent to that over which the strand extends. If desired, the wrapper with the strand 12 disposed in a desired position may be dipped in a bath of skin producing material, such as melted wax or the like, so that the whole surface may receive a coating, as distinct from coating a strip thereof adjacent to the strand 12.

The coating medium 18 tends to adhere to the wrapper 16 and in overlying the strand 12 detachably holds the strand in a desired predetermined relation on the wrapper along substantially the entire length of the strand 12. When the tab 14 is moved to constrict the bight 13, the strand becomes taut by reason of the securement of the strand to the wrapper by the coating 18 and its reactions to the tab. As the strand is urged to move laterally, the bight portions nearest the tab 14 first detach themselves from securement on the wrapper and move into the body. The bight portions progressively more remote to said portions are subsequently detached from the wrapper and progressively move into the body. Thus, the constriction of the bight and lateral partitioning movement of the strand is guided through the body as is the case in the embodiments heretofore described.

When the coating medium 18 is used in conjunction with the second strand 17, the openings 21 will be substantially sealed. The wrapper 16 may be then used as an exterior packaging element to good advantage.

When a partitioning means such as the strand 32 of the arrangement shown in Figs. 6 and 7 of the accompanying drawings is used, the strand 32 is laid to form a bight 33 about the body 31. The strand has embodied in its extension 34 a means for moving the strand to close the bight 33 and partition the body. As will be observed, the strand 32 is formed by a tape or strip of sheet material. The strand 32 is connected along substantially its entire length to a means for supporting the same embodied in the sheet material wrapper 36. The strand 32 preferably constitutes a part of the wrapper 36 and is defined by parallel scorings 35 of the wrapper 36. The scorings 35 may be formed by partially cutting the wrapper material, by periodic and repetitive perforation thereof or by so ironing or creasing the wrapper along said score lines as to produce a discontinuity of homogeneous structure in the wrapper along said scorings.

When the strand moving extension 34 is first moved to constrict the bight 33, the tape strand 32 tends, on becoming taut and being directed laterally into the body, to fold along a substantially central line, as shown at 37 in Fig. 6. Thus the tape strand doubles on itself to form a cutting edge crease 38 and a relatively streamlined body portion. The body thus streamlined and provided with the more or less sharp leading edge 38 moves easily through the body 31 to partition the same. Thus, the material of the tape strand 32 may be of lesser tensile strength than that normally required.

The tape strand 32 is guided in the constriction of the bight 33 by the supporting means wrapper 36 and by the resistance to detachment therefrom exerted along the scorings 35. In this particular embodiment the wrapper is partitioned along lines coinciding with the plane of body partition to the same advantages as were mentioned with regard to certain embodiments of the structure shown in Figs. 4 and 5.

While in accordance with the provisions of the statutes, I have illustrated and described the best forms of my invention now known to me, those skilled in the art will readily understand that many changes may be made in the forms of constructions disclosed, without departing from the spirit of my invention as set forth in the appended claims.

I claim:

1. An article of manufacture having a partible body and a partitioning means therefor; said partitioning means including a strand; a foldable sheet means adapted for wrapping about the partible body for supporting the strand in linear extension across the foldable sheet means and coinciding with a predetermined plane of proposed partition of the body; means for detachably securing the strand to said sheet means along substantially the entire length of the strand in said predetermined relation; and means connected to the strand adapted to be grasped to facilitate moving the strand from securement to said sheet means and through said body to thereby partition the body in said plane.

2. An article of manufacture having a partible body and a partitioning means therefor; said partitioning means including a strand; a foldable means substantially confining the body for supporting the strand in linear extension across the foldable means and coinciding with a predetermined plane of proposed partition of the body; means for detachably securing the strand along substantially its entire length to said foldable means in said predetermined relation; and means connected to the strand adapted to be grasped to facilitate moving the strand from securement to said foldable means and through said body to thereby partition the body in said plane.

3. An article of manufacture having a partible body and a partitioning means therefor; said partitioning means including a strand; a wrapper adapted for folding around the partible body for supporting the strand in linear extension across the wrapper coinciding with a predetermined plane of proposed partition of the body; means including strand enclosing portions of said wrapper for detachably securing the strand along substantially its entire length to said wrapper in said predetermined relation; and means connected to the strand adapted to be grasped to facilitate moving the strand from securement to said wrapper and through said body to thereby partition the body in said predetermined plane.

4. An article of manufacture having a partible body and a partitioning means therefor; said partitioning means including a strand; a foldable sheet means adapted for wrapping about said partible body for supporting the strand in linear extension across the foldable sheet means and coinciding with a predetermined plane of proposed partition of the body; a coating medium on said foldable sheet means for detachably securing the strand to said foldable sheet means along substantially the entire length of the strand in said predetermined relation; and means connected to the strand adapted to be grasped to facilitate moving the strand from securement to said foldable sheet means and through said body to thereby partition the body in said predetermined plane.

5. An article of manufacture having a partible body and a partitioning means therefor; said partitioning means including a strand; a foldable sheet means adapted for wrapping about said partible body for supporting the strand in linear extension across the foldable sheet means coinciding with a predetermined plane of proposed partition of the body; a membranous medium adherent to and extending over a surface portion of said foldable sheet means and portions of said partitioning strand along substantially the entire length thereof and forming means for detachably securing the strand to said foldable sheet means in said predetermined relation; and means connected to the strand adapted to be grasped to move the strand from securement to said foldable sheet means and through said body to thereby partition the body in said predetermined plane.

6. An article of manufacture having a particle body and a partitioning means therefor; said partitioning means including a strand; wrapper means for supporting the strand in linear extension across the wrapper in spaced relation to two opposing edges thereof and in a predetermined plane of proposed partition of the body; means for detachably securing the strand to said wrapper means at a plurality of spaced points of such proximity and number as to secure the strand to the wrapper means along substantially the entire length of the strand in a predetermined relation; and means connected to the strand adapted to be grasped to facilitate moving the strand from securement to said wrapper means and through said body to thereby partition the body in said plane.

7. An article of manufacture having a partible body and a partitioning means therefor, said partitioning means including a strand; a sheet element disposed adjacent to said body for supporting the strand in linear extension across the sheet element in a predetermined plane of proposed partition of the body; means exclusively comprising homogeneous portions of said sheet element for detachably securing the strand along substantially its entire length to said sheet element in a predetermined relation; and means connected to the strand adapted to be grasped to facilitate moving the strand from securement to said sheet element and through said body to thereby partition the body in said plane.

8. An article of manufacture having a partible body and a partitioning means therefor; said partitioning means including a strand; means for supporting the strand in linear extension coinciding with a predetermined plane of proposed partition of the body; means including spaced portions of said supporting means, homogeneous and integral therewith and defined by interspaced openings therein through which the strand extends for detachably securing the strand to said supporting means in said predetermined relation; and means connected to the strand adapted to be grasped to move the strand from securement to said supporting means and through said body to thereby partition the body in said predetermined plane.

9. An article of manufacture having a partible body and a partitioning means therefor, said partitioning means including a pair of strands having alternate interengaged and disengaged portions; a sheet means adapted to be disposed in surface engagement with the body for supporting the strands in linear extension coinciding with a predetermined plane of proposed partition of the body; the sheet means having a plurality of spaced openings through which the interengaged strand portions extend and alternating homogeneous portions on either side of which the disengaged strand portions extend to form means for detachably securing the strands to said sheet means along substantially the entire effective lengths of the strands in said predetermined relation; and means connected to the strands adapted to be grasped to facilitate moving the strands from securement to said supporting means and through said body to thereby partition the body in said predetermined plane.

10. An article of manufacture having a partible body and a partitioning means therefor; said partitioning means including a strand; means for supporting the strand in linear extension coinciding with a predetermined plane of proposed partition of the body; means including a second strand for detachably securing the strand to said supporting means in said predetermined relation; and means connected to the strand adapted to be grasped to facilitate moving the strand from securement to said supporting means and through said body to thereby partition the body in said predetermined plane.

11. An article of manufacture having a partible body and a partitioning means therefor; said partitioning means including a strand; means for supporting the strand in linear extension coinciding with a predetermined plane of proposed partition of the body; means including a second strand attached to said supporting means and having a portion looped about said partitioning strand for detachably securing the strand to said supporting means in said predetermined relation; and means connected to the strand adapted to be grasped to move the strand from securement to said supporting means and through said body to thereby partition the body in said plane.

12. An article of manufacture having a partible body and a partitioning means therefor; said partitioning means including a pair of strands having interengaging portions; a foldable sheet means adapted for wrapping about the partible body for supporting the strands in linear extension across the foldable sheet means and coinciding with a predetermined plane of proposed partition of the body; means for detachably securing the strands to said foldable sheet means along substantially their entire lengths in said predetermined relation; and means connected to the strands adapted to be grasped to facilitate moving the strands from securement to said foldable sheet means and through said body to thereby partition the body in said predetermined plane.

13. An article of manufacture having a partible body and a partitioning means therefor; said partitioning means including a foldable sheet means substantially enwrapping the partible body and having a strand forming portion severably connected thereto and supported thereby in linear extension in the plane of desired partition of said body; and means connected to said strand forming portion adapted to be grasped to facilitate moving the strand forming portion to sever the same from said foldable sheet means and to facilitate moving the same through said body to thereby partition the same along said plane.

14. An article of manufacture having a partible body and a combined wrapper and partitioning means therefor; said combined wrapper and partitioning means including a plurality of parallel extending foldable strand forming sheet portions, each adapted for wrapping about the body and disposed in an encircling relation to said body at right angles to and intersecting the plane of desired partition of said body; and means connected to each strand forming portion adapted to be grasped to facilitate moving the strand forming portion from its wrapper forming relation with the other strand forming portions through the body to thereby partition the same along said plane.

CALE J. SCHNEIDER.

REFERENCES CITED

The following references are of record in the file of this patent:

UNITED STATES PATENTS

| Number | Name | Date |
| --- | --- | --- |
| 276,199 | Street | Apr. 24, 1883 |
| 760,310 | Church | May 17, 1904 |
| 1,171,462 | Rice | Feb. 15, 1916 |
| 2,176,768 | Luchte | Oct. 17, 1939 |
| 2,304,544 | Clarke | Dec. 8, 1942 |
| 2,320,386 | Schneider | June 1, 1943 |

FOREIGN PATENTS

| Number | Country | Date |
| --- | --- | --- |
| 18,819 | Great Britain | Aug. 19, 1914 |

Certificate of Correction

Patent No. 2,447,096. August 17, 1948.

CALE J. SCHNEIDER

It is hereby certified that errors appear in the printed specification of the above numbered patent requiring correction as follows: Column 1, line 11, and column 8, line 45, claim 6, for the word "particle" read *partible*; and that the said Letters Patent should be read with these corrections therein that the same may conform to the record of the case in the Patent Office.

Signed and sealed this 16th day of November, A. D. 1948.

[SEAL]

THOMAS F. MURPHY,
*Assistant Commissioner of Patents.*